G. F. MOORE.
Machine for Shaping Boot and Shoe Counters.
No. 198,550. Patented Dec. 25, 1877.
Fig. 1.
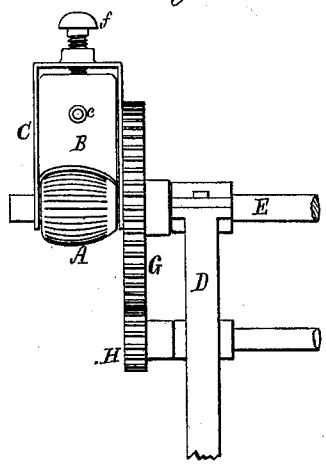
Fig. 3.
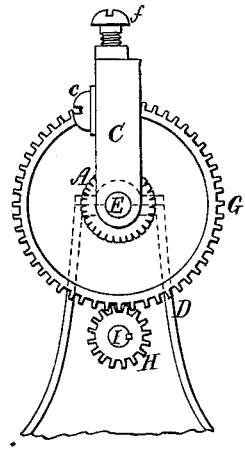
Fig. 2.
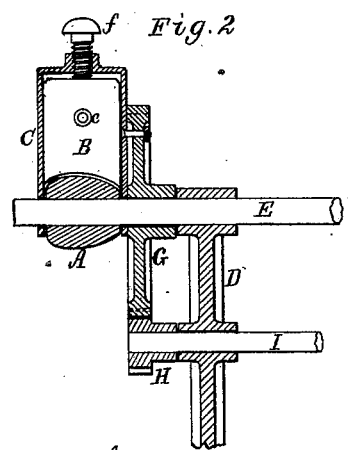
Fig. 4.
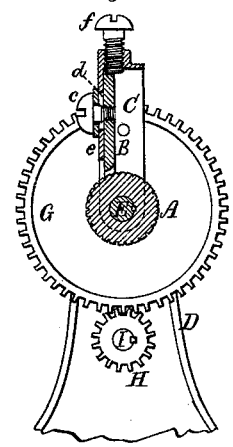
Fig. 7.
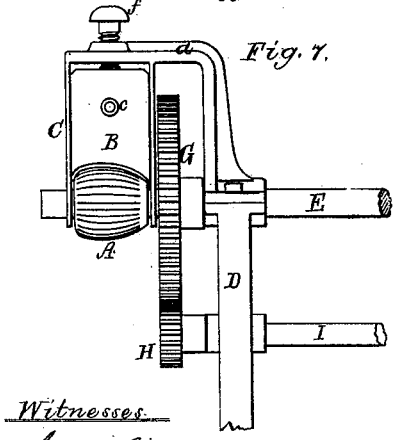
Fig. 6. Fig. 5.
 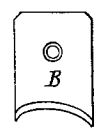
Witnesses.
S. N. Piper
L. La Muller
Inventor
George F. Moore.
by R. H. Eddy atty.

UNITED STATES PATENT OFFICE.

GEORGE F. MOORE, OF KENNEBUNK, MAINE, ASSIGNOR TO MOUSAM MANUFACTURING COMPANY, OF SAME PLACE.

IMPROVEMENT IN MACHINES FOR SHAPING BOOT AND SHOE COUNTERS.

Specification forming part of Letters Patent No. 198,550, dated December 25, 1877; application filed November 12, 1877.

*To all whom it may concern:*

Be it known that I, GEORGE F. MOORE, of Kennebunk, of the county of York and State of Maine, have invented a new and useful Improvement in Machinery for Molding or Shaping Counters for Boots or Shoes; and do hereby declare the same to be described in the following specification, and represented in the accompanying drawings, of which—

Figure 1 is a front elevation, Fig. 2 a longitudinal section, Fig. 3 an end view, and Fig. 4 a transverse section, of a machine of my improved kind, the plane of section of the latter figure being through the shaping-blade, to be hereinafter explained. Fig. 5 is a front view, and Fig. 6 a vertical section, of such blade.

In carrying out my present invention, I make use of an ovated or egg-shaped former, and a single shaping-blade to operate therewith, either one being stationary while the other is capable of being revolved—that is to say, if the former is wholly stationary while in operation with the blade, the said blade is to be revoluble about such former, and to have mechanism for so moving it. So, if the blade is stationary, in other respects than being capable of being adjusted nearer to or farther from the former, as occasion may require, the said former is to be capable of being revolved on and around its axis, and to be furnished with mechanism for so operating it. The blank or piece of leather or material for the formation of a counter is to be introduced endwise between the blade and the former, and it will be molded or shaped by them while either is put in revolution.

In the above-mentioned Figs. 1, 2, 3, and 4, the ovated former shown at A is represented as fixed on a shaft or rod, E, which, with the said former, is to be stationary while the machine is in operation, the shaping-blade B or such and its carrier C being revoluble about the said former, and provided with mechanism for effecting such a movement of such blade, or of it and its carrier.

Fig. 7 is a front view of the machine, showing the blade or its carrier as stationary, and the ovated former as rotary, and furnished with mechanism for imparting to it partial or entire revolutions.

In this latter figure the carrier is represented as fastened to an arm, a, projecting from the supporting-frame D, the ovated former being fixed on and to a rotary shaft, E, furnished with a gear, G, engaging with a pinion, H, carried by a driying-shaft, I. On turning this latter shaft the ovated former will be put in revolution under the blade.

In Figs. 1, 2, 3, the gear G is represented as fastened to the carrier, which, with such gear, is pivoted on the shaft, so as to be capable of turning on and around such and the ovated former.

The carrier, shaped as shown, has the blade B arranged within it, and held in place by a clamp-screw, c, which goes through a slot, d, made lengthwise in the back plate e of the said carrier. An adjusting-screw, f, screwed into the carrier, and against the upper end of the blade, serves to regulate the distance of the blade from the ovated former. That edge of the blade which is next the former is curved into parallelism therewith, and is beveled laterally, as shown, to enable the counter-blank to readily enter between it and the former.

I do not herein claim the combination of an ovated or convex counter-former and two rotary concave shapers, provided with mechanism for moving the counter-former downward toward the shapers, so as to cause them to move or be moved simultaneously in opposite directions about it, all being as represented in the United States Patent No. 192,341, granted to me or my assignees, as in such case the former was not revolvable, but was simply movable vertically, two shapers being also used, neither of which could be revolved entirely around the said former.

In my present machine I use but one shaper, it being a blade with a beveled edge, the ovated former being scored, grooved, or roughened, so as to hold the blank from slipping on it.

Furthermore, I do not claim a counter-molding machine having an ovated former and a concave mold, the latter extending about halfway around the said former transversely of it, as in the place of such a mold I use a simple blade, by which the material is easier stretched and curved or molded and freed from the former. This blade may have one or more springs to press it into contact with the material, and allow it (the said blade) to accommodate itself to the varying thickness thereof, as may be desirable, though I prefer adjusting and clamp screws applied to the blade and its carrier, as hereinbefore explained.

Besides the above, my present machine has other advantages, as it is not so liable to tear or break the grain of the blank or overstrain it.

I claim as my invention—

In a machine for shaping boot and shoe counters, the combination of the ovated former, the single blade, and mechanism for revolving either about the axis of the former, substantially as set forth.

GEORGE F. MOORE.

Witnesses:
  C. W. GOODNOW,
  DEAN S. BAKER.